(12) United States Patent
Higashimata

(10) Patent No.: US 6,256,573 B1
(45) Date of Patent: Jul. 3, 2001

(54) SYSTEM AND METHOD FOR CONTROLLING INTER-VEHICLE DISTANCE TO PRECEDING VEHICLE FOR AUTOMOTIVE VEHICLE EQUIPPED WITH THE SYSTEM AND METHOD

(75) Inventor: Akira Higashimata, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/176,219

(22) Filed: Oct. 21, 1998

(30) Foreign Application Priority Data

Oct. 23, 1997 (JP) .................................................. 9-290795

(51) Int. Cl.$^7$ ................................ G06F 7/00; B60T 7/12; G05D 1/00
(52) U.S. Cl. ............................. 701/96; 701/93; 701/300; 180/167; 180/170; 340/903; 340/435; 340/436; 342/69
(58) Field of Search ................................ 701/96, 93, 300, 701/301, 302; 180/179, 171, 168, 169, 170, 167; 318/587; 340/903, 901, 943, 435, 436, 902, 904; 123/352, 350; 342/454, 455, 47, 70, 71, 458, 72, 61, 69, 73, 456, 457

(56) References Cited

U.S. PATENT DOCUMENTS

| | | | |
|---|---|---|---|
| 4,947,952 | * 8/1990 | Kajiwara | 180/178 |
| 5,166,881 | * 11/1992 | Akasu | 701/96 |
| 5,179,286 | * 1/1993 | Akasu | 250/559.38 |
| 5,215,159 | * 6/1993 | Nishida | 180/179 |
| 5,396,426 | 3/1995 | Hibino et al. | 701/96 |
| 5,400,864 | 3/1995 | Winner et al. | 180/169 |
| 5,529,139 | * 6/1996 | Kurahashi et al. | 180/169 |
| 5,587,908 | * 12/1996 | Kajiwara | 701/96 |
| 5,710,565 | 1/1998 | Shirai et al. | 342/70 |
| 5,731,977 | * 3/1998 | Taniguchi et al. | 701/93 |
| 5,938,714 | * 8/1999 | Satonaka | 701/96 |
| 5,959,572 | * 9/1999 | Higashimata et al. | 342/70 |
| 5,969,640 | * 10/1999 | Timm et al. | 340/903 |

FOREIGN PATENT DOCUMENTS

| | | |
|---|---|---|
| 43 37 872 A 1 | 6/1994 | (DE) . |
| 41 00 993 C 2 | 11/1994 | (DE) . |
| 8-282330 | 10/1996 | (JP) . |

\* cited by examiner

Primary Examiner—Jacques H. Louis-Jacques
(74) Attorney, Agent, or Firm—Foley & Lardner

(57) ABSTRACT

In system and method for an automotive vehicle equipped with the system and defined as a system vehicle, an inter-vehicle distance from the system vehicle to a preceding vehicle traveling ahead of the system vehicle is detected, a velocity of the system vehicle is detected, a determination is made whether the system vehicle is running to follow up the preceding vehicle at a target value of the inter-vehicle distance, a control system for performing a feedback control of the detected value of the inter-vehicle distance to the target value thereof is provided, a target value of the velocity of the system vehicle is outputted, a control gain of the feedback control system being modified according to the detected value of the inter-vehicle distance and a result of a determination whether the system vehicle is running to follow up the preceding vehicle at a target value of the inter-vehicle distance and a braking force and a driving force of the system vehicle are controlled so as to make a detected value of the system vehicle velocity coincident with the target value of the velocity of the system vehicle.

19 Claims, 9 Drawing Sheets

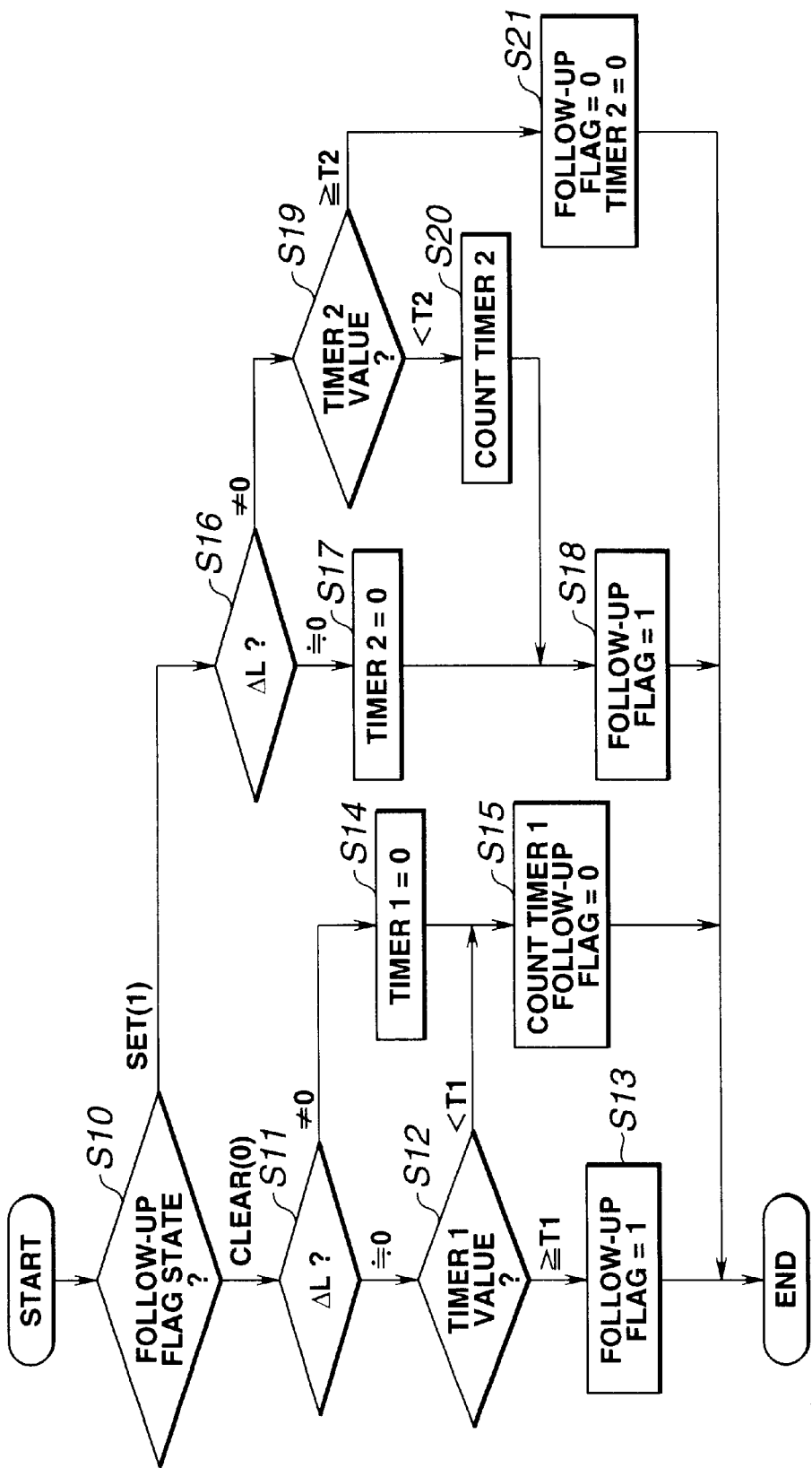

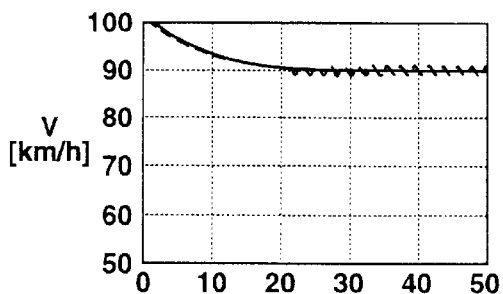
FIG.9A
FIG.9B
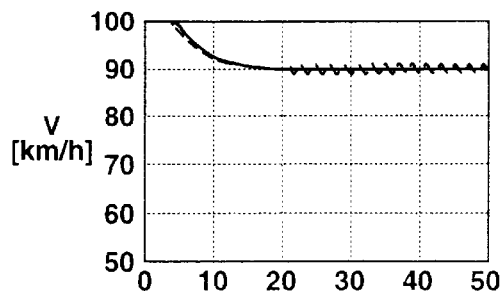
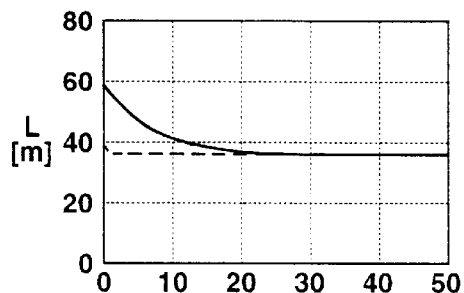
FIG.9C
FIG.9D
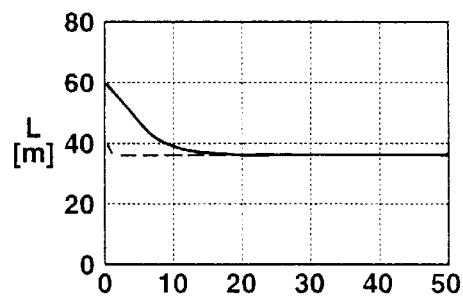
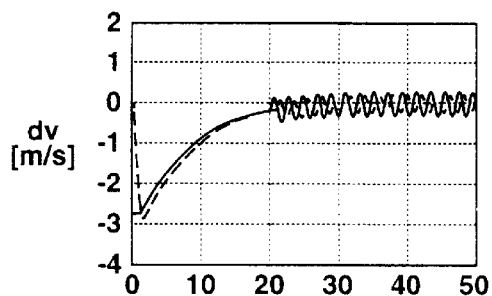
FIG.9E
FIG.9F
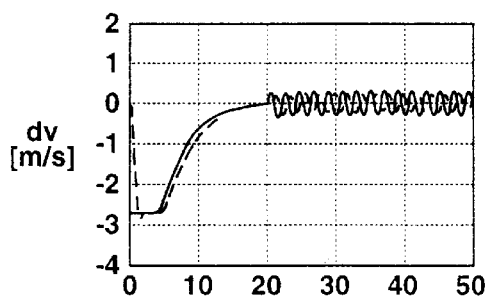
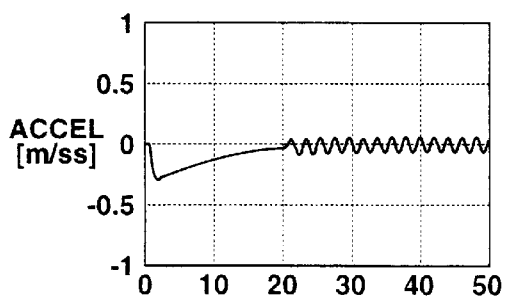
FIG.9G
FIG.9H
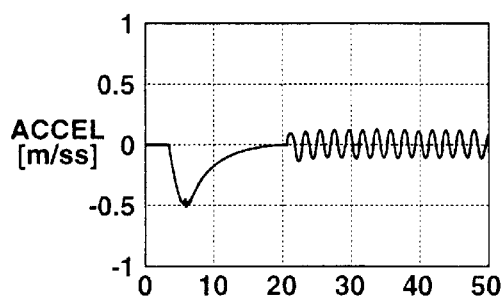

SYSTEM AND METHOD FOR CONTROLLING INTER-VEHICLE DISTANCE TO PRECEDING VEHICLE FOR AUTOMOTIVE VEHICLE EQUIPPED WITH THE SYSTEM AND METHOD

The contents of the Application No. Heisei 9-290795, with a filing date of Oct. 23, 1997 in Japan, are herein incorporated by reference.

BACKGROUND OF THE INVENTION a) Field of the Invention

The present invention relates to system and method for controlling an inter-vehicle distance to a vehicle traveling ahead (viz., a preceding vehicle) applicable to an automotive vehicle (hereinafter, referred to as a system vehicle) equipped with the system and method which can follow the preceding vehicle while maintaining a constant(safety) inter-vehicle distance.

b) Description of the Related Art:

A Japanese Patent Application First Publication No. Heisei 8-282330 published on Oct. 29, 1996 exemplifies a previously proposed system for controlling the inter-vehicle distance to the preceding vehicle for the system vehicle in which a feedback control gain of an inter-vehicle distance controller in the inter-vehicle distance controlling system is reduced so as to moderately accelerate the system vehicle when a detected inter-vehicle distance is relatively long (large) and is increased so as to decelerate the system vehicle when the detected inter-vehicle distance is relatively short (small).

SUMMARY OF THE INVENTION:

However, in the previously proposed inter-vehicle distance controlling system, if a general time duration, on order of one second or two seconds, for which the system vehicle is running to follow behind the preceding vehicle at the short inter-vehicle distance, the system vehicle responds to a motion of the preceding vehicle with an excessive sensitivity so as to become uncomfortable for the system vehicle occupants since the large (relatively high) control gain is set when the system vehicle is running under a preceding vehicle follow-up condition.

It is, therefore, an object of the present invention to provide improved system and method for controlling the inter-vehicle distance to the preceding vehicle for the system vehicle equipped with the system and method in which a control gain is modified so as to provide a moderate responsive characteristic, with an appropriate sensitivity, to the motion of the preceding vehicle for the system vehicle when the system vehicle enters the preceding vehicle follow up condition, viz., the system vehicle is running on a traffic lane to follow up the preceding vehicle at a target value of the inter-vehicle distance to the preceding vehicle which is even at the relatively short inter-vehicle distance.

The above-described object can be achieved by providing a system for an automotive vehicle equipped with the system and defined as a system vehicle. The system comprises: a first detector for detecting an inter-vehicle distance from the system vehicle to a preceding vehicle traveling ahead of the system vehicle; a second detector for detecting a velocity of the system vehicle; a determinator for determining whether the system vehicle is running to follow up the preceding vehicle at a target value of the inter-vehicle distance; an inter-vehicle distance controller having a control system for performing a feedback control of the detected value of the inter-vehicle distance to the target value thereof and for outputting a target value of the velocity of the system vehicle, a control gain of the feedback control system being modified according to the detected value of the inter-vehicle distance and a result of a determination by the determinator; and a vehicle velocity controller for controlling a braking force and a driving force of the system vehicle so as to make a detected value of the system vehicle velocity coincident with the target value of the velocity of the system vehicle.

The above-described object can also be achieved by providing a method for an automotive vehicle equipped with the system and defined as a system vehicle. The method comprises the steps of: a) detecting an inter-vehicle distance from the system vehicle to a preceding vehicle traveling ahead of the system vehicle; b) detecting a velocity of the system vehicle; c) determining whether the system vehicle is running to follow up the preceding vehicle at a target value of the inter-vehicle distance; d) providing a control system for performing a feedback control of the detected value of the inter-vehicle distance to the target value thereof; e) outputting a target value of the velocity of the system vehicle, a control gain of the feedback control system being modified according to the detected value of the inter-vehicle distance and a result of a determination at the step c); and f) controlling a braking force and a driving force of the system vehicle so as to make a detected value of the system vehicle velocity coincident with the target value of the velocity of the system vehicle.

BRIEF DESCRIPTION OF THE DRAWINGS

FIG. 6 is another operational flowchart for explaining a subroutine executed at a step S1 in FIG. 5.

FIGS. 8A, 8B, 8C, 8D, 8E, 8F, 8G, and 8H and FIGS. 9A, 9B, 9C, 9D, 9E, 9F, 9G and 9H are characteristic graphs representing a system vehicle velocity V [Km/h], an inter-vehicle distance L[m], an relative velocity dV [m/s], and acceleration/deceleration [m/ss], as results of simulations when a preceding vehicle velocity $V_T$ is varied.

BEST MODE FOR CARRYING OUT THE INVENTION

Reference will hereinafter be made to the drawings in order to facilitate a better understanding of the present invention.

Figure 1A:
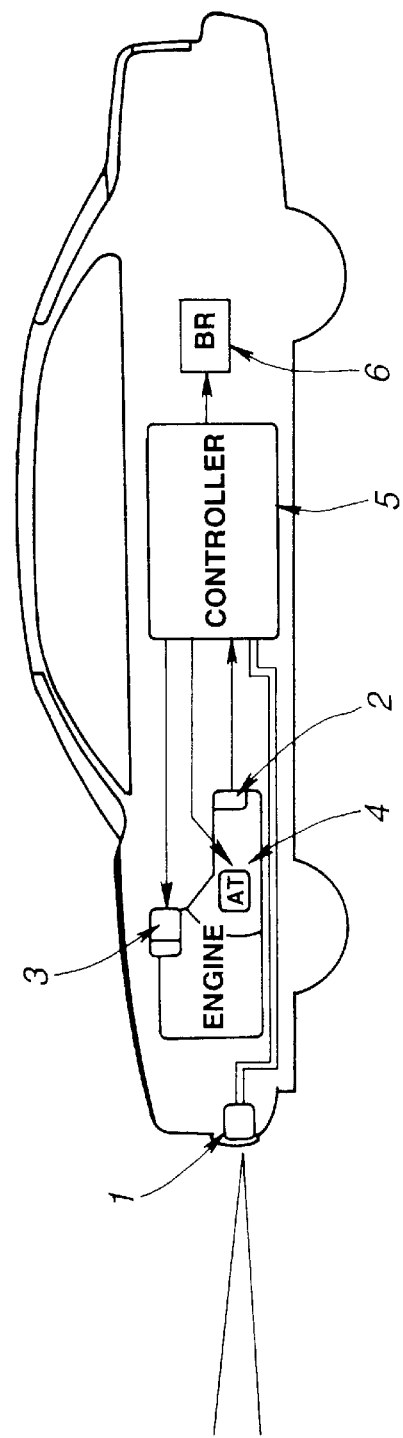
FIG. 1A is a schematic side view of an automotive vehicle to which a system for controlling an inter-vehicle distance to a preceding vehicle traveling ahead in a preferred embodiment according to the present invention is applicable.

FIG. 1A shows an explanatory view of an automotive vehicle (viz., system vehicle) to which the system for controlling an inter-vehicle distance to a preceding vehicle traveling ahead of the system vehicle in the preferred embodiment according to the present invention is applicable.

In FIG. 1A, an inter-vehicle distance sensor head 1 is a sensor head of a radar type such that a laser beam is scanned over a given scanning angle in a width-wise direction of the system vehicle and the reflected beams are received from an object(s) present in, generally, a forward detection zone defined by the scanning angle to detect the object(s), e.g., a preceding vehicle. It is noted that an electromagnetic wave or ultra-sonic wave may be used in place of the laser beam.

A vehicle velocity sensor 2, attached onto an output axle of an automatic transmission 4, outputs a pulse train signal whose period is in accordance with a revolution velocity of the output axle of the automatic transmission.

A throttle valve actuator 3 (constituted, for example, by a DC motor) actuates a throttle valve of an engine associated with the automatic transmission 4 to be opened or closed in response to a throttle valve opening angle signal so as to vary an intake air quantity to be supplied to the engine to adjust an engine output torque. The automatic transmission 4 varies a gear shift ratio thereof in accordance with a vehicle velocity and the engine output torque. A braking system 6 serves to develop a braking force to be applied to the system vehicle shown in FIG. 1A.

Figure 1B:
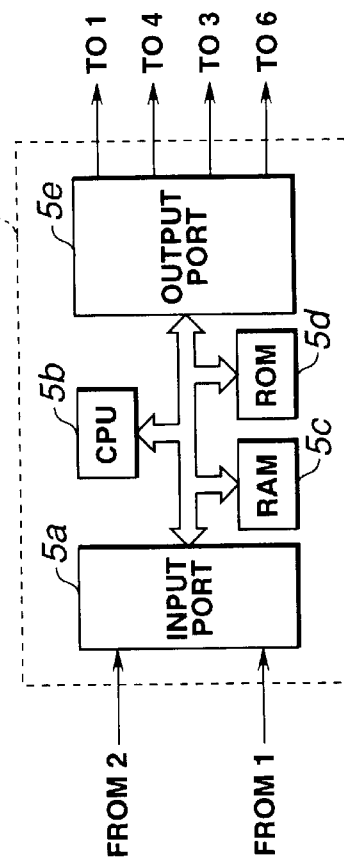
FIG. 1B is a circuit block diagram of a controller shown in FIG. 1A.

A controller 5 includes a microcomputer and its peripheral circuit. The microcomputer of the controller 5 includes, as shown in FIG. 1B, a CPU (Central Processing Unit) 5b, a ROM (Read Only Memory) 5d, a RAM (Random Access Memory) 5c, an Input Port 5a, an Output Port 5e, and a common bus.

Figure 2:
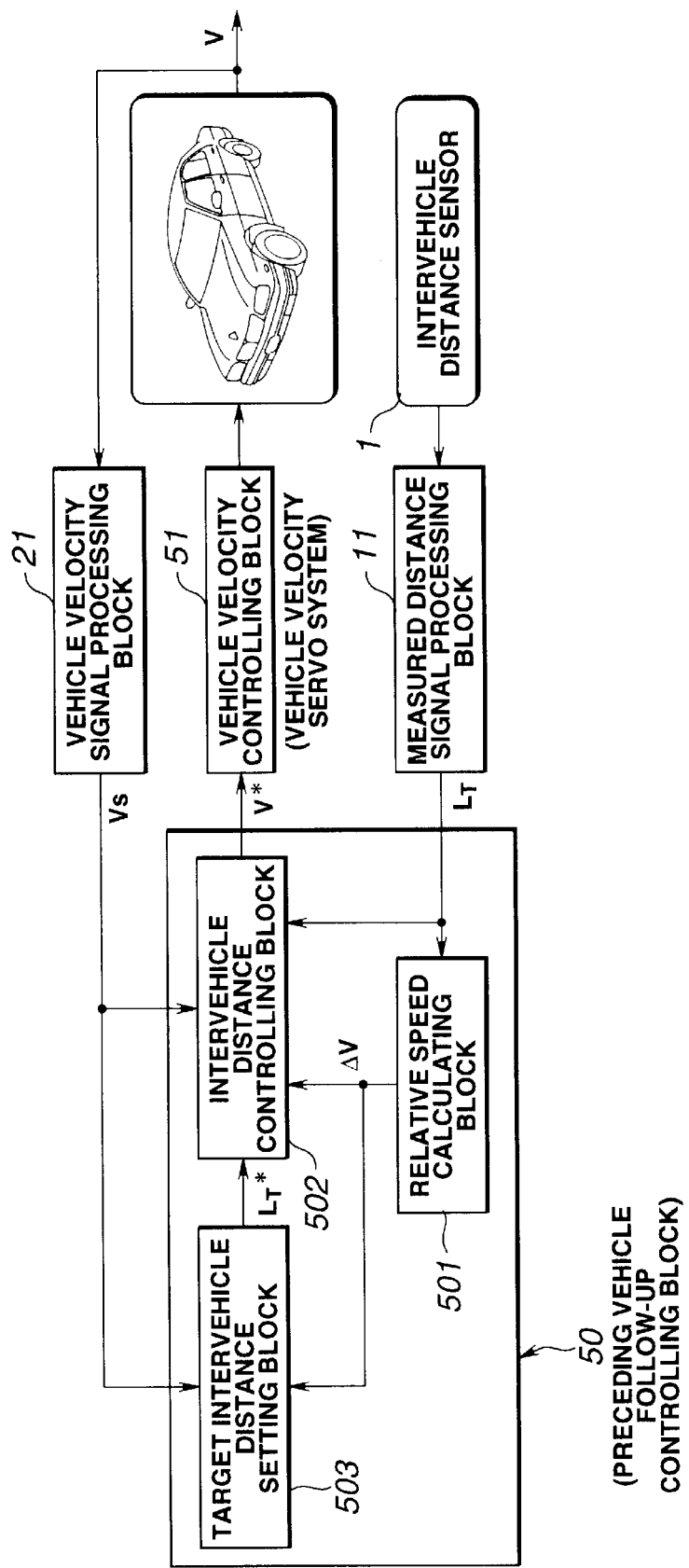
FIG. 2 is a functional block diagram of the system for controlling an inter-vehicle distance to the preceding vehicle in the preferred embodiment shown in FIGS. 1A and 1B.

FIG. 2 shows a software structure of the controller 5, viz., a functional block diagram of the inter-vehicle distance controlling system in the preferred embodiment.

In FIG. 2, an inter-vehicle distance measuring block 11 measures a time duration from a time at which the laser beam is scanned and transmitted to the forward detection zone to a time at which the reflected beams from the objects are received to calculate an inter-vehicle distance $L_T$ of one of the objects which is the preceding vehicle. It is noted that, if a plurality of preceding vehicles are present, one of the preceding vehicle needs to be specified and, thereafter, the inter-vehicle distance $L_T$ to be specified preceding vehicle needs to be calculated.

A method of selecting one of the preceding vehicles from the objects is well known. For example, a U.S. Pat. No. 5,710,565 issued on Jan. 20, 1998 discloses the method of selecting the preceding vehicle from the plurality of beam reflecting objects (of the disclosure of which is herein incorporated by reference).

A vehicle velocity signal processing block 21 measures the period of the pulse train signal from the vehicle velocity sensor 2 to detect the system vehicle velocity Vs.

A preceding vehicle follow-up controlling block 50 includes a relative velocity calculating block 501, an inter-vehicle distance controller 502, and a target inter-vehicle distance setting block 503, and calculates a target inter-vehicle distance $L_T^*$ and a target vehicle velocity V* on the basis of the detected inter-vehicle distance $L_T$ from the inter-vehicle distance measuring block 11 and the detected vehicle velocity Vs from the vehicle velocity signal processing block 21.

The inter-vehicle distance controlling block 502 calculates a target system vehicle velocity V* to make the detected value of the inter-vehicle distance $L_T$ coincident with the target inter-vehicle distance $L_T^*$ with the calculated relative velocity ΔV taken into consideration.

Furthermore, the target inter-vehicle distance setting block 503 sets the target inter-vehicle distance $L_T^*$ in accordance with the system vehicle velocity Vs or the preceding vehicle velocity $V_T$.

Furthermore, the target inter-vehicle distance setting block 503 sets the target inter-vehicle distance LT* in accordance with the system vehicle velocity Vs or the preceding vehicle velocity $V_T$.

A vehicle velocity controller 51 controls the opening angle of the engine throttle valve via the throttle valve actuator 3, the gear shift ratio of the automatic transmission 4, and the braking force of the braking system 6 to make the system vehicle velocity Vs coincident with the target vehicle velocity V* calculated by the preceding vehicle follow-up controlling block 50.

Next, a system of an inter-vehicle distance control, viz., the preceding vehicle inter-vehicle distance controlling block 50 in the system for controlling the inter-vehicle distance to the preceding vehicle in the preferred embodiment will chiefly be described below.

The inter-vehicle distance controlling block 50 shown in FIG. 2 can be said to be such a one-input-two-outputs system that controls the target value of the inter-vehicle distance $L_T^*$ and the relative velocity ΔV by a single input (target vehicle velocity V*). Hence, this feedback control system is designed using a state feedback (regulator).

That is to say, state variables $x_1$ and $x_2$ of this feedback control system are defined in two equations (1) and (2) described below.

$$x_1 = V_T - V_S \qquad (1),$$

wherein $V_T$ denotes a velocity of the preceding vehicle.

$$x_2 = L_T^* - L_T \qquad (2).$$

In addition, a control input, viz., the output of this feedback control system is denoted by Δ V* and is defined in an equation (3).

$$\Delta V^* = V_T - V^* \qquad (3).$$

The inter-vehicle distance $L_T$ is given by:

$$L_T = \int (V_T - V_S) dt + L_0 \qquad (4),$$

wherein $L_0$ denotes an initial value of the inter-vehicle distance $L_T$.

In a vehicle velocity servo system, i.e., the vehicle velocity controller 51, an actual vehicle velocity Vs can be expressed in an approximation form to the target vehicle velocity V* by a first order lag as given by an equation (5) recited in TABLE 1.

In the equation (5), τv denotes a time constant of the vehicle servo system and S denotes a complex variable, i.e., a Laplace transform operator.

Suppose that the preceding vehicle velocity $V_T$=constant, an equation (6) recited in TABLE 2 can be established from the equations (1), (3), and (5).

Furthermore, if the target inter-vehicle distance $L_T^*$ = constant, an equation (7) recited in TABLE 3 can be obtained according to the two equations (2) and (4).

Hence, a system's state equation can be described in an equation (8) recited in TABLE 4.

In the system whose state equation is expressed as the equation (8), a controlled input is given by an equation (9) recited in TABLE 5.

In addition, a state equation of a whole feedback control system in which a state feedback is carried out can be represented in an equation (10) recited in TABLE 5.

In the equation (10), an equation (11) recited in TABLE 5 can be substituted.

A characteristic equation of the whole feedback control system can be introduced into an equation (12) recited in TABLE 5.

On the basis of a transfer characteristic of the whole velocity servo system described above, a first control gain fd and a second control gain fv are set so that characteristics to converge the inter-vehicle distance $L_T$ into $L_T^*$ and to converge the relative velocity $\Delta V$ into zero give desired characteristics.

That is to say, the first and second control gains fd and fv are set using an equation (13) recited in TABLE 5.

Hence, the first control gain fd is expressed in an equation (15) recited in TABLE 6 and the second control gain fv is expressed in an equation (14) recited in TABLE 7.

The inter-vehicle distance controlling block 502 of the preceding vehicle controller 50 calculates the target vehicle velocity V* for the system vehicle to run after the preceding vehicle (to follow up the preceding vehicle) maintaining the inter-vehicle distance $L_T$ at the target inter-vehicle distance $L_T^*$ on the basis of the detected value of the inter-vehicle distance $L_T$ and the relative velocity $\Delta V$.

Figure 3:
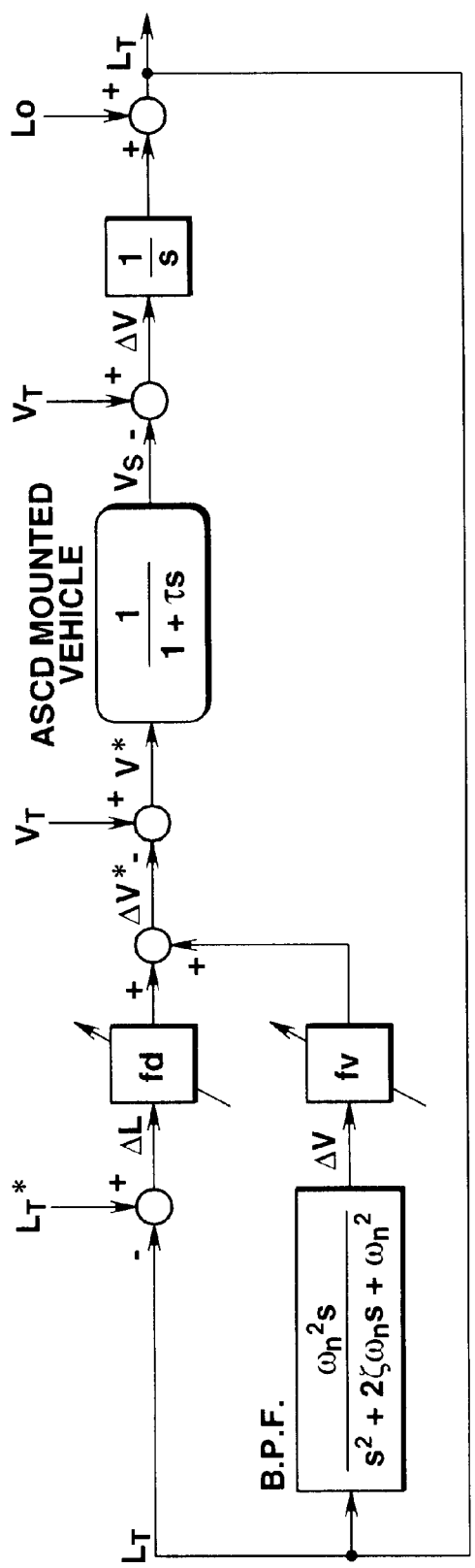
FIG. 3 is a functional block diagram of an inter-vehicle distance controller and of a system vehicle velocity controller incorporated into the controller in the inter-vehicle distance controlling system shown in FIGS. 1A and 1B.

Specifically, as shown in FIG. 3, the inter-vehicle distance controlling block 502 calculates a deviation ($\Delta L$) between a value of the target inter-vehicle distance (LT*) and the detected value of the inter-vehicle distance ($L_T$) ($\Delta L = L_T^* - L_T$) and calculates an addition of the deviation $\Delta L$ multiplied by the first control gain fd to the relative velocity $\Delta V$ multiplied by the first control gain fv to derive a target relative velocity $\Delta V^*$ as given in an equation (16) recited in TABLE 7.

It is noted that FIG. 3 shows the whole velocity servo control system executed in terms of software in the controller 5.

It is also noted that both of the first and second control gains fd and fv are parameters to determine a control performance to follow up the preceding vehicle. It is noted that in the equation (16), $\Delta V$ denotes the relative velocity of the system vehicle to the preceding vehicle, namely, $\Delta V = VT - Vs$, and is derived by passing the detected value LT of the inter-vehicle distance through abandpass filter (B. P. F.) as shown in FIG. 3. A transfer function of the band pass filter is expressed in an equation (17) recited in TABLE 7.

Furthermore, the inter-vehicle distance controlling block 502 derives the target vehicle velocity V* as in an equation (18) recited in TABLE 7.

The system vehicle velocity controlling block 51 controls the braking force and/or the driving force of the system vehicle so that the system vehicle velocity Vs indicates its target velocity value V*.

In the whole preceding vehicle follow-up control system in which the state feedback is carried out, the convergence characteristic is approximated by a second order system as expressed in a second term of the equation (12) recited in TABLE 5. In the equation (12), I denotes an identity matrix.

In an equation of (13), ωn denotes a specific angular velocity of the whole second-order system, viz., the velocity servo system and ζ denotes a damping factor of the whole second-order system.

Then, the first and second control gains fd and fv can be derived by setting system's poles for the system to provide desired responsive characteristics.

Normally, until the system vehicle enters the following up state, namely, until the system vehicle is running after the preceding vehicle with the deviation between the target inter-vehicle distance and the detected value of the preceding vehicle being approximately zeroed, a relatively slow pole setting is carried out to make a normal scheduling for setting the first and second control gains fd and fv so that the control is started at an earlier stage and the detected value of the inter-vehicle distance $L_T$ is slowly converged into the target inter-vehicle distance $L_T^*$ when the inter-vehicle distance $L_T$ is relatively long. On the other hand, in a case where another vehicle than the detected preceding vehicle is interrupted in the forward detection zone of the sensor head 1 near to the system vehicle, i.e., in a case where the inter-vehicle distance $L_T$ is relatively short, the pole setting is carried out to make the normal scheduling for setting the control gains fv and fd so that the detected value of the inter-vehicle distance $L_T$ is quickly converged (a settling time is relatively short) into the target inter-vehicle distance $L_T^*$.

For example, suppose that the time constant τv in the vehicle velocity servo system (51) is 0.5 seconds and the system poles in the case of the slow convergence characteristic (a case (a)) is −0.1 (a multiple root) and is −0.4 (the multiple root) in the case of the quick convergence characteristic (a case (b)), the first and second control gains fd and fv are derived from the above-described equations (15) and (14) and obtained in numerical values as shown in TABLE 8.

Figure 4A:
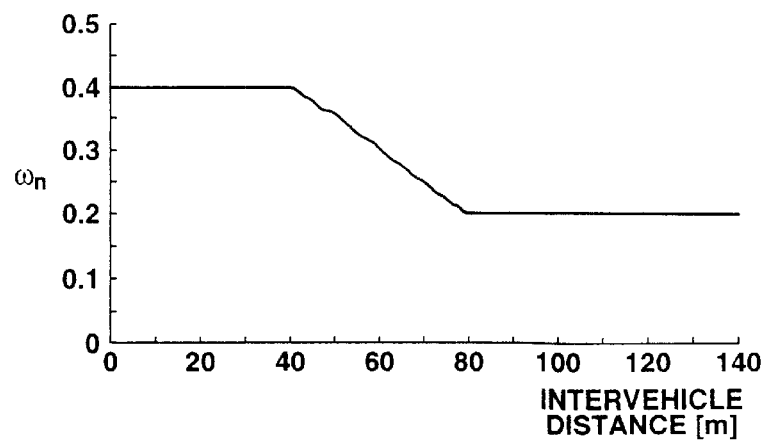
FIGS. 4A, 4B, and 4C are characteristic graphs representing normal scheduling examples of ωn, fd (first control gain), and fv (second control gain) used in the inter-vehicle distance controller shown in FIG. 3.

The set poles in the above described cases (a) and (b) are upper and lower limits. For example, ωn is set, as shown in FIG. 4A, with respect to the inter-vehicle distance $L_T$.

If the inter-vehicle distance $L_T$ is equal to or below 40 meters in FIG. 4A, ωn is set to 0.4 ([rad/sec.])(quick response).

If the inter-vehicle distance is as long as 80 meters or more, ωn is set to 0.2 ([rad/sec.])(slow response).

When the detected value $L_T$ of the inter-vehicle distance indicates any value from 40 meters to 80 meters, an interpolation is carried out to set ωn in order to continuously vary the first and second gains fd and fv.

Figure 4B:
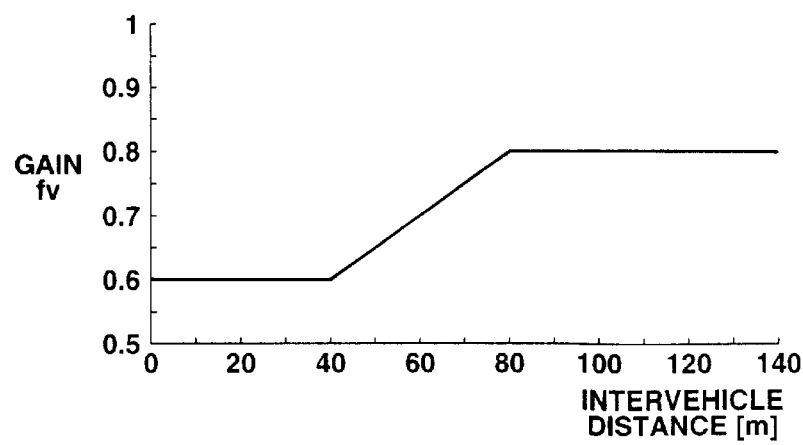
Figure 4C:
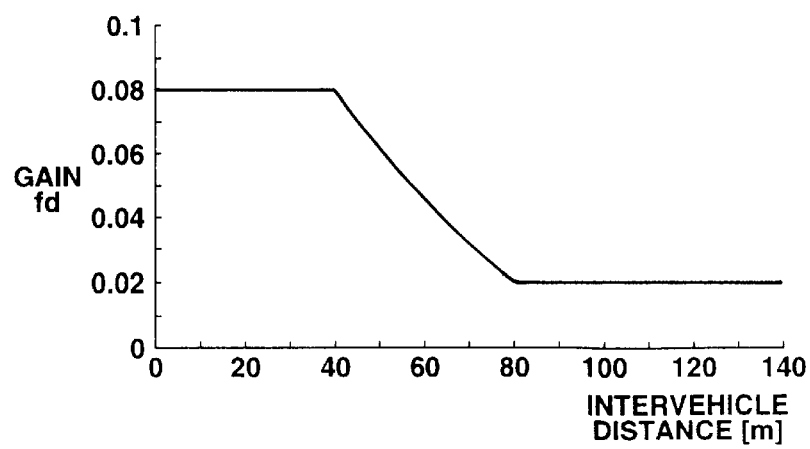

The first and second control gains fd and fv are derived as shown in FIGS. 4C and 4B, respectively, using ωn which the above-described interpolation and the above-described method are advanced.

In this way, when the normal scheduling of setting the first and second control gains fd and fv are thus carried out, the vehicle velocity servo control system slowly responds in the case where the system vehicle approaches to the preceding vehicle which is located far way from the system vehicle and the vehicle servo system quickly responds in a case where the interruption of the system vehicle occurs at a short inter-vehicle distance to the system vehicle.

However, the target inter-vehicle distance $L_T^*$ in the follow-up control is, in many cases, set to an inter-vehicle time duration generally in 1.5 to 2 seconds. In these cases, the inter-vehicle distance ranges from 42 meters to 55 meters at a vehicle velocity of 100 Km/h.

Hence, high control gains cannot help being set which always indicates the quick response characteristic during the follow-up control so that the system vehicle motion becomes sensitive to the motion of the preceding vehicle including the interrupting vehicle.

Therefore, in the preferred embodiment, after the system vehicle is running to follow up the preceding vehicle at a predetermined inter-vehicle distance, namely, the system vehicle falls in a steady state of the follow-up control, the control gains fv and fd are modified so as to provide the slow responsive characteristic (the settling time is relatively long) to improve the comfort of the system vehicle.

Figure 5:
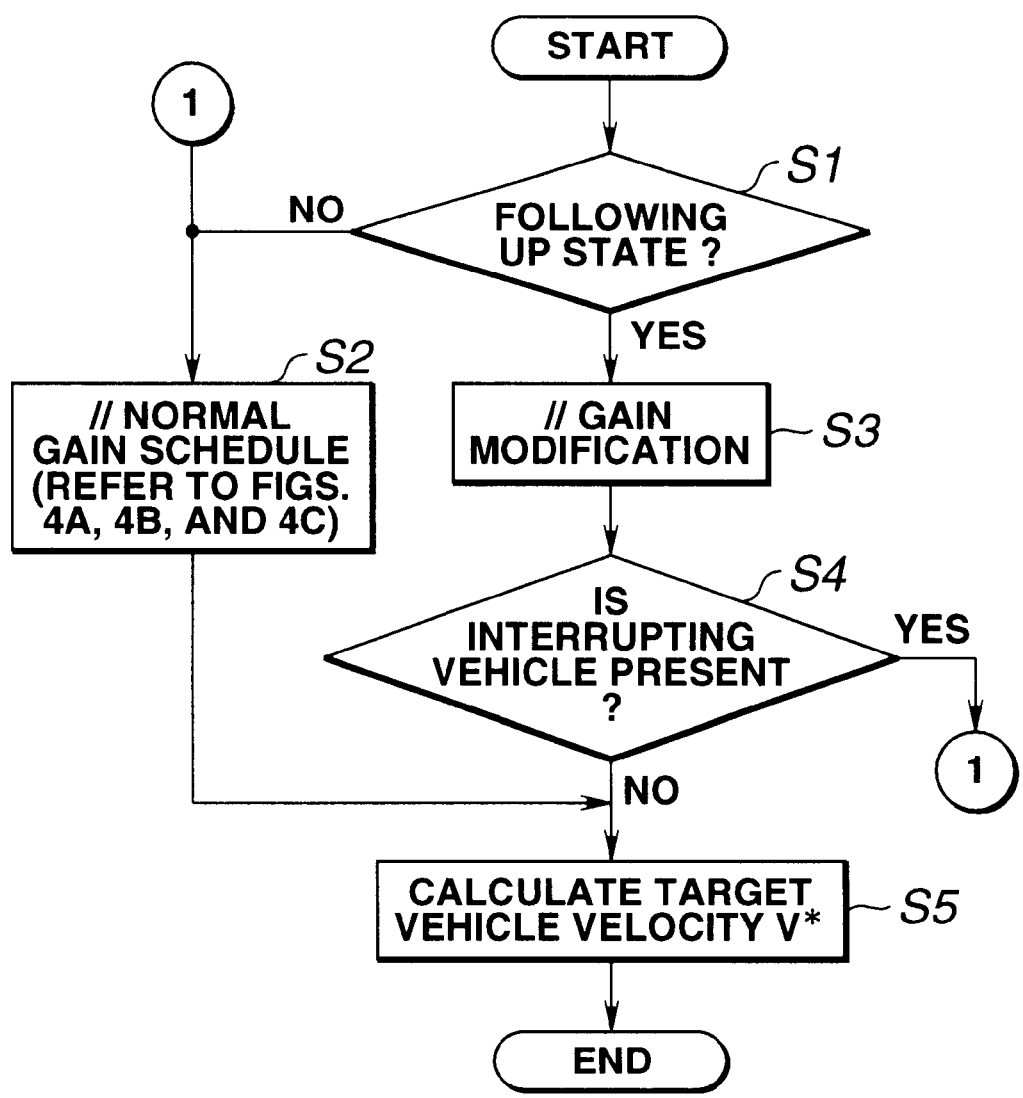
FIG. 5 is an operational flowchart for modifying the control gains executed in the controller in the preferred embodiment according to the present invention shown in FIGS. 1A and 1B.

FIG. 5 shows a flowchart for modifying the control gains during the system vehicle being running to follow up the preceding vehicle at the target value of the inter-vehicle distance.

The flowchart shown in FIG. 5 serves to explain an operation of the system for controlling the distance to the preceding vehicle in the preferred embodiment according to the present invention.

At a step S1, a subroutine shown in FIG. 6 is executed. In details, at the step S1, the CPU 5b of the controller 5 determines whether on the basis of the deviation (ΔL) between the target inter-vehicle distance ΔL, the CPU 5b is under the following up state to the preceding vehicle and is in the steady state.

That is to say, at a step S10 in FIG. 6, the CPU 5b recognizes whether a follow-up flag state is set or cleared. The set state of the follow-up flag indicates that the controller 5 is under a control to put the system vehicle into the follow-up control and is in the steady-state condition.

If the CPU 5b recognizes that the follow-up flag is cleared (0) at the step S10, the routine goes to steps S1 through S5 to determine whether the system vehicle is in the steady state of the follow-up control.

In details, at the step S11, the CPU 5b of the controller 5 recognizes whether the deviation ΔL between the target inter-vehicle distance $L_T^*$ and the detected value of the inter-vehicle distance $L_T$ is approximately zeroed.

If ΔL≈0 at the step S11, the routine goes to a step S12. At the step S12, the CPU 5b recognizes whether a first timer 1 indicates a first predetermined period of time T1, i.e., a measured elapsed time at which ΔL≈0 at the step S11 indicates T1.

If the measured elapsed time is equal to or above the first predetermined period of time T1, the routine goes to a step S13. Upon the determination that it is in the steady state of the follow-up control, the follow-up flag is set.

When the CPU 5b determines that it is the steady state condition, the follow-up flag is set.

If the CPU 5b determines that the deviation ΔL in the inter-vehicle distance is not approximately zeroed (ΔL≠0) at the step S11, the routine goes to a step S13.

At a step S13, the CPU 5b sets the follow-up flag to "1".

It is noted that a second timer 2 is a timer to measure an elapsed time after the follow-up state is temporarily halted.

If the CPU 5b determines that the deviation ΔL of the inter-vehicle distance at the step S16 is not approximately zeroed, the routine goes to a step S19 in which a value of a second timer 2 is cleared.

At the subsequent step S18, the follow-up flag is set. It is noted that the second timer 2 is another timer to measure the elapsed time upon the temporary halt of the follow-up state.

If, at the step S16, the CPU 9b determines that the deviation ΔL of the inter-vehicle distance is not approximately zeroed (≠0), the routine goes to a step S19 in which the CPU 5b of the controller 5 determines whether a value of a second timer T2 is equal to or above a second predetermined period of time T2.

That is to say, if the CPU 9b determines that the deviation ΔL of the inter-vehicle distance is not approximately zeroed (ΔL ≠0 at the step S16), the routine goes to the step S19 in which the CPU 5b measures the elapsed time from the second timer 2 to recognize the elapsed time from the time at which the follow-up state is temporarily halted.

In more details, at the step S19, the CPU 5b determines whether the follow-up state is eliminated due to such as a separation of the preceding vehicle from the system vehicle or a temporary halt of the follow-up state occurs due to an out of range of the forward detection zone by the inter-vehicle distance sensor 1 of the system vehicle.

If the second predetermined period of time T2 is not elapsed upon the temporary halt of the follow-up state (T2 <0) at the step S19 (second timer value <T2), the counter continues the count by means of the second timer 2. It is noted that at a step S18 coming from either of the step S17 or S20, the follow-up flag is set to 1.

It is noted that although the CPU 5b determines whether the system vehicle falls in the steady state of the follow-up control on the basis of the deviation ΔL (=$L_T^*$−$L_T$) of the inter-vehicle distance, in the preferred embodiment, a determination accuracy of the follow-up state can be improved with the relative velocity ΔV (=$V_T$ −Vs) to the preceding vehicle taken into consideration.

For example, the CPU 5b determines that the steady-state of the follow-up control occurs when the deviation ΔL of the inter-vehicle distance is approximately zeroed and a predetermined period of time has passed after the relative velocity ΔV is approximately zeroed.

If the CPU 5b of the controller 5 determines that the steady-state of the follow-up state occurs at the step S1 of FIG. 5, the routine goes to a step S3 of FIG. 5.

Figure 7A:
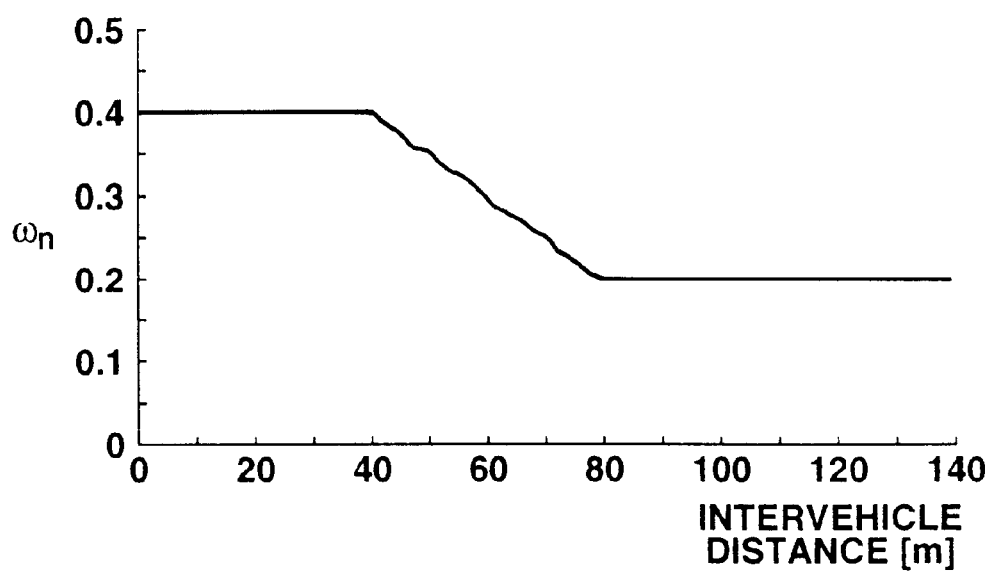
FIGS. 7A and 7B are characteristic graphs representing examples of variations of ωn used to calculate the first and second control gains fd and fv of a feedback control system of the inter-vehicle distance controller shown in FIG. 2.
Figure 7B:
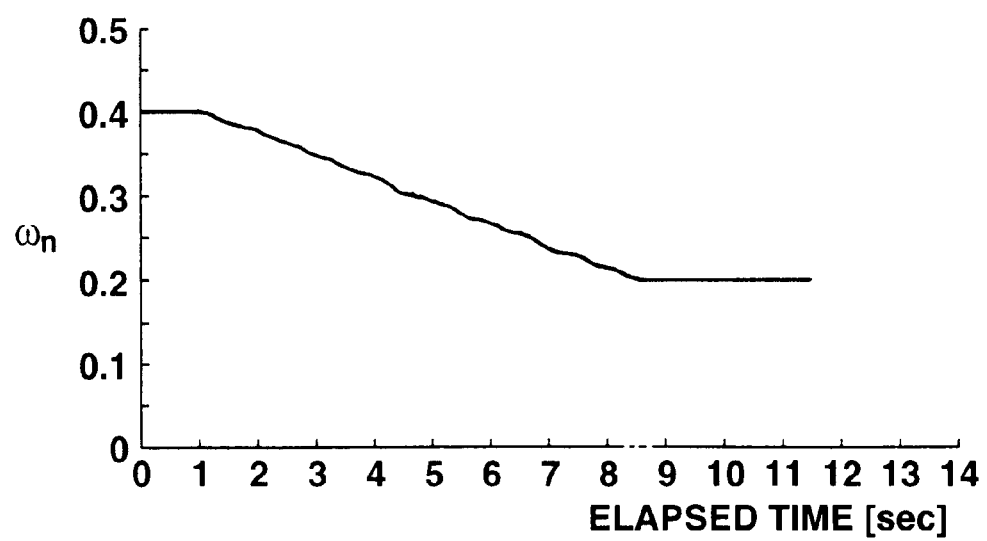
Figure 8A:
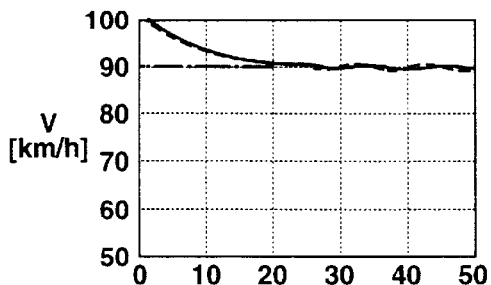
Figure 8B:
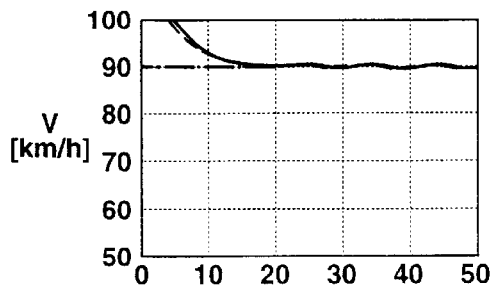
Figure 8C:
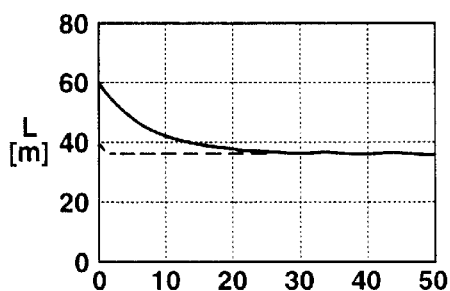
Figure 8D:
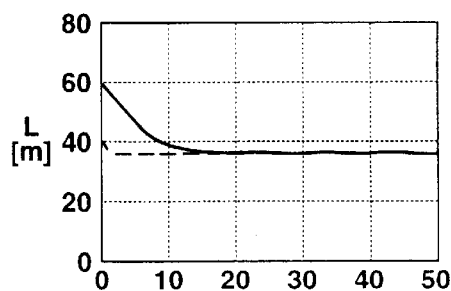
Figure 8E:
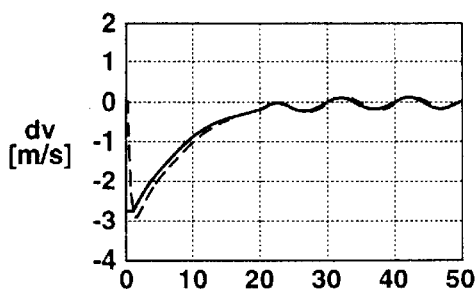
Figure 8F:
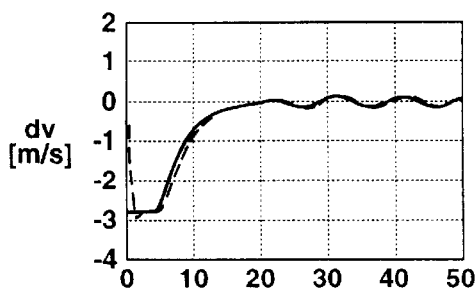
Figure 8G:
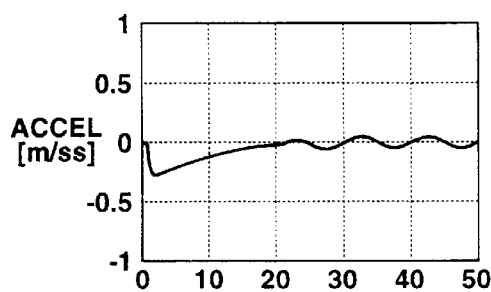
Figure 8H:
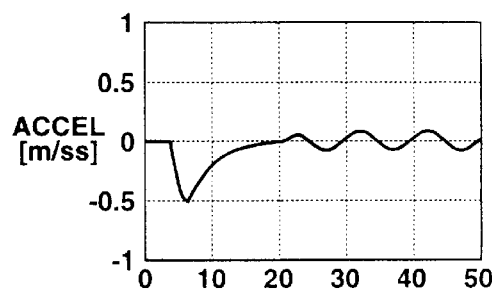

At the step S3, both control gains fv and fd are modified (varied) in accordance with a gain scheduling of FIGS. 7A and 7B.

FIGS. 7A and 7B show the angular velocity ωn with respect to the inter-vehicle distance $L_T$ in accordance with the normal gain scheduling and show the angular velocity ωn to the inter-vehicle distance $L_T$ in accordance with the gain scheduling upon the modification of the control gain.

Suppose, now, that the inter-vehicle distance of the follow-up control steady state is 40 meters. At the normal gain scheduling carried out at the step S2, ωn is set to 0.4 [rad/sec] (ωn=0.4 [rad/s]).

With the angular velocity ωn as a starting point, ωn is set to 0.4 [rad/s] (ωn=0.4 [rad/sec]).

With the angular velocity ωn as a starting point, ωn is modified as a function of the elapsed time upon the entrance of the steady state of the follow-up control as shown in FIG. 7B.

Finally, the lowest (slowest) ωn in FIG. 7B (ωn=0.2 [rad/sec.]) is set.

It is noted that, in the preferred embodiment, the control gains fv and fd are modified as the function of the elapsed time.

However, with the gains in the steady state arbitrarily set, the gains may be switched into lower values.

Referring back to a step S4 of FIG. 5, the CPU 5b of the controller 5 determines the presence or absence of the interrupting vehicle, namely, determines whether another vehicle is interrupting between the preceding vehicle and the system vehicle on the basis of the variation state of the inter-vehicle distance $L_T$ or the relative velocity ΔV.

In the steady state of the follow-up control, the control gains are low.

The response to the other vehicle located near to the vehicle becomes slow.

If the interrupting vehicle is present (Yes at the step S4), the routine goes to the step S2.

At the step S2, the normal schedulings shown in FIGS. 4A, 4B, and 4C are returned.

At the subsequent step S5, the CPU 5b of the controller 5 calculates the target vehicle velocity V* to make the detected value of the inter-vehicle distance LT coincident with the target value $L_T^*$ on the basis of the control gains fv and fd to perform the system velocity control.

If the CPU 5b of the controller 5 does not determine that the steady state of the follow-up control occurs (No at the step S1), the routine goes to the step S2.

The control gains fv and fd are set in accordance with the normal scheduling procedure, e.g., as shown in FIGS. 4A, 4B, and 4C. At the subsequent step S5, the controller 5 calculates the target vehicle velocity V* to make the inter-vehicle distance $L_T$ coincident with the target value $L_T*$ on the basis of the control gains fv and fd set at the subsequent step S5 to perform the system vehicle velocity.

FIGS. 8A, 8B, 8C, 8D, 8E, 8F, 8G, 8H, 9A, 9B, 9C, 9D, 9E, 9F, 9G and 9H show simulation results of the inter-vehicle distance control in the case when the control gains are modified. The simulated vehicle velocity V [Km/h] are shown in FIGS. 8A, 8B, 9A, and 9B. The simulated inter-vehicle distance L [m] are shown in FIGS. 8C, 8D, 9C, and 9D. The simulated inter-vehicle distance L [m] are shown in FIGS. 8E, 8F, 9E, and 9F. The simulated acceleration/deceleration Accel [m/ss] are shown in FIGS. 8G, 8H, 9G, and 9H.

It is noted that solid lines in FIGS. 8A through 9H denote actual values and broken lines in FIGS. 8A through 9H denote target values.

It is also noted that FIGS. 8A through 8H are the simulation results when the preceding vehicle velocity $V_T$ is 0.1 Hz and is varied in a range of ±0.5 Km/h, FIGS. 8A, 8C, 8E, and 8G are the cases when the low gains are set, FIGS. 9A, 9C, 9E, and 9G are the cases when the high gains are set, FIGS. 9B, 9D, 9F, and 9H are the cases when the high gains are set.

It is also noted that FIGS. 9A through 9H are the simulation results when the preceding vehicle velocity $V_T$ is 1 Hz and is varied in a range of ±1 Km/h and FIGS. 9A, 9C, 9E, and 9G are the case when the high gains are set and FIGS. 9B, 9D, 9F, and 9H are the cases where the low gains are set.

As appreciated from FIGS. 8A through 9H, the variation in the velocity of the preceding vehicle does not affect the variation in the velocity of the preceding vehicle when the lower gains are set to the control gains fv and fd of the inter-vehicle distance control system.

When the control gains fv and fd in the inter-vehicle distance control system are set according to the inter-vehicle distance so that the gains are set to provide the slow responsive characteristic when the inter-vehicle distance is long and to provide a faster responsive characteristic when the inter-vehicle distance is relatively short. When the system vehicle falls in the steady state of the follow-up control, the gains are varied so as to provide the slow responsive characteristic.

Hence, the system vehicle slowly responds to the motion of the preceding vehicle when the system vehicle is running to follow up the preceding vehicle at the target value of the inter-vehicle distance and can prevent an excessively sensitive response to the unnecessary motion of the preceding vehicle from occurring.

It is noted that the ASCD mounted vehicle shown in FIG. 3 corresponds to the system vehicle and ASCD is an abbreviation for an Automatic Velocity Control Device.

It is also noted that the first predetermined period of time (T1) may correspond to an approximately 9 seconds as appreciated from FIG. 7B.

TABLE 1

$$V_S = \frac{1}{1+\tau_v S} V^* \quad (5)$$

TABLE 2

$$\dot{x}_1 = -\frac{1}{\tau_v} x_1 + \frac{1}{\tau_v} \Delta V^* \quad (6)$$

TABLE 3

$$\dot{X}_2 = -(V_T - V_S) = -X_1 \quad (7)$$

TABLE 4

$$\frac{d}{dt}\begin{bmatrix} \dot{x}_1 \\ \dot{x}_2 \end{bmatrix} = \begin{bmatrix} -1/\tau_v & 0 \\ -1/\tau_v & 0 \end{bmatrix} \begin{bmatrix} x_1 \\ x_2 \end{bmatrix} + \begin{bmatrix} -1/\tau_v \\ 0 \end{bmatrix} \Delta V^* \quad (8)$$

TABLE 5

$$u = FX, \ F = [fv \ fd] \quad (9)$$
$$X = (A + BF)X \quad (10)$$

$$A' = (A + BF) = \begin{bmatrix} (fv-1)/\tau_v & fd/\tau_v \\ -1 & 0 \end{bmatrix} \quad (11)$$

$$|sI - A'| = s^2 + \frac{(1-fv)}{\tau_v}s + \frac{fd}{\tau_v} = 0 \quad (12)$$

$$s^2 + \frac{(1-fv)}{\tau_v}s + \frac{fd}{\tau_v} = s^2 + 2\zeta\omega_n s + \omega_n^2 = 0 \quad (13)$$

TABLE 6

$$fv = 1 - 2\zeta W_n \cdot \tau_v \quad (14)$$
$$fd = \omega_n^2 \cdot \tau_v \quad (15)$$

TABLE 7

$$\Delta V^* = fd \cdot \Delta L + fv \cdot \Delta V \quad (16)$$

$$\frac{\omega_n^2 s}{s^2 + 2\zeta\omega_n s + \omega_n^2} \quad (17)$$

$$V^* = V_T - \Delta V^* \quad (18)$$

TABLE 8

| Pole | $\omega_n$ | $\zeta$ | fv | fd |
|------|------------|---------|-----|------|
| −0.1 | 0.2 | 1.0 | 0.8 | 0.02 |
| −0.4 | 0.4 | 1.0 | 0.6 | 0.08 |

What is claimed is:

1. A system for an automotive vehicle equipped with the system and defined as a system vehicle, comprising:

a first detector for detecting an inter-vehicle distance from the system vehicle to a preceding vehicle traveling ahead of the system vehicle;

a second detector for detecting a velocity of the system vehicle;

a determinator for determining whether the system vehicle is following the preceding vehicle at a target value of the inter-vehicle distance;

an inter-vehicle distance controller having a control system for performing a feedback control of the detected value of the inter-vehicle distance to the target value thereof and for outputting a target value of the velocity of the system vehicle, a control gain of the feedback control system being modified according to the detected value of the inter-vehicle distance and a result of a determination by the determinator; and a vehicle velocity controller for controlling a braking force and a driving force of the system vehicle so as to make a detected value of the system vehicle velocity coincident with the target value of the velocity of the system vehicle, wherein the inter-vehicle distance controller includes a deviation calculator for calculating a deviation between the detected value of the inter-vehicle distance and the target value of the inter-vehicle distance and the determinator determines that the system vehicle is following the preceding vehicle at the target value of the inter-vehicle distance when the calculated deviation is equal to or below a predetermined inter-vehicle distance value and a predetermined period of time has passed after the calculated deviation is equal to or below the predetermined inter-vehicle distance.

2. A system for an automotive vehicle equipped with the system and defined as a system vehicle as claimed in claim 1, wherein the inter-vehicle distance controller includes: a relative velocity calculator for calculating a relative velocity of the system vehicle to the preceding vehicle on the basis of the detected value of the inter-vehicle distance and wherein the determinator determines that the system vehicle is following the preceding vehicle at the target value of the inter-vehicle distance when the calculated deviation is equal to or below a predetermined inter-vehicle distance value and a first predetermined period of time has passed after a calculated value of the relative velocity is equal to or below a predetermined relative velocity value.

3. A system for an automotive vehicle equipped with the system and defined as a system vehicle as claimed in claim 1, wherein the inter-vehicle distance controller sets the control gain such as to quicken a responsive characteristic of the feedback control system when the detected value of the inter-vehicle distance is equal to or below a predetermined inter-vehicle distance value and modifies the set control gain to a new control gain such as to slow the responsive characteristic of the feedback control system when the determinator determines that the system vehicle is following the preceding vehicle at the target value of the inter-vehicle distance.

4. A system for an automotive vehicle equipped with the system and defined as a system vehicle as claimed in claim 1, wherein the inter-vehicle distance controller modifies the set control gain of the feedback control system according to an elapsed time upon the system vehicle beginning to follow the preceding vehicle at the target value of the inter-vehicle distance.

5. A system for an automotive vehicle equipped with the system and defined as a system vehicle as claimed in claim 1, wherein the inter-vehicle distance controller includes a deviation calculator for calculating a deviation between the detected value of the inter-vehicle distance and the target value of the inter-vehicle distance and wherein the determinator does not determine that the system vehicle is following the preceding vehicle at the target value of the inter-vehicle distance when a second predetermined period of time has passed, the calculated deviation exceeding a predetermined deviation value, after the determinator has determined that the system vehicle is following the preceding vehicle at the target value of the inter-vehicle distance.

6. A system for an automotive vehicle equipped with the system vehicle and defined as a system vehicle as claimed in claim 5, wherein, when the determinator does not determine that the system vehicle is following the preceding vehicle at the target value of the inter-vehicle distance, the control gain of the feedback control system is set so as to quicken the responsive characteristic of the feedback control system when the detected value of the inter-vehicle distance is equal to or below a first predetermined inter-vehicle distance and so as to slow the responsive characteristic of the feedback control system when the detected value of the inter-vehicle distance is above the first predetermined inter-vehicle distance value.

7. A system for an automotive vehicle equipped with the system and defined as a system vehicle as claimed in claim 6, wherein the first predetermined inter-vehicle distance value is approximately 40 meters.

8. A system for an automotive vehicle equipped with the system and defined as a system vehicle as claimed in claim 1, wherein the inter-vehicle distance controller includes: a relative velocity calculator for calculating a relative velocity of the system vehicle to the preceding vehicle on the basis of the detected value of the inter-vehicle distance; a deviation calculator for calculating a deviation between the detected value of the inter-vehicle distance and the target value of the inter-vehicle distance; a first multiplier for multiplying the calculated deviation by a first control gain; and a second multiplier for multiplying a calculated value of the relative velocity by a second control gain; an adder for adding results of multiplications by both of the first and second multipliers to derive a target value of the relative velocity of the system vehicle to the preceding vehicle; and a target system velocity calculator for calculating and outputting the target velocity of the system vehicle to the vehicle velocity controller on the basis of the target value of the relative velocity from the adder.

9. A system for an automotive vehicle equipped with the system and defined as a system vehicle as claimed in claim 8, wherein the inter-vehicle distance controller derives the target value ($V^*$) of the system vehicle velocity as follows: $V^*=V_T-\Delta V^*$, wherein $V_T$ denotes a vehicle velocity of the preceding vehicle and is expressed as $V_T=\Delta V-Vs$, wherein $\Delta V$ denotes the relative velocity of the system vehicle to the preceding vehicle and Vs denotes the detected value of the velocity of the system vehicle, $\Delta V^*$ denotes the target value of the relative velocity of the system vehicle to the preceding vehicle as a result of an addition by the adder and is expressed as $\Delta V^*=fd^*\Delta L+fv^*\Delta V$, wherein fd denotes a first control gain of the feedback control system and fv denotes a second control gain of the feedback control system, $\Delta L$ denotes a deviation between the target value of the inter-vehicle distance ($L_T^*$) and the detected value of the inter-vehicle distance ($L_T$).

10. A system for an automotive vehicle equipped with the system and defined as a system vehicle as claimed in claim 9, wherein the inter-vehicle distance controller includes a band pass filter having a transfer function expressed as $\omega n^2 s/(s^2+2\zeta\omega ns+\omega n^2)$, wherein s denotes a Laplace tranform operator and $s=j\omega$, $\omega n$ denotes a specific angular frequency of the feedback control system, and $\zeta$ denotes a damping factor of the feedback control system, and derives the relative velocity ($\Delta V$) of the system vehicle to the preceding vehicle from the detected value of the inter-vehicle distance using the band pass filter.

11. A system for an automotive vehicle equipped with the system and defined as a system vehicle as claimed in claim 10, wherein $fv=1-2\zeta\omega n\tau v$ and $fd=\omega n^2\times\tau v$, wherein $\tau V$ denotes a time constant of the vehicle velocity controller, and wherein the determinator comprises: a first determinator for determining a deviation ($\Delta L$) between the target value of the inter-vehicle distance ($L_T^*$) and the detected value of the inter-vehicle distance ($L_T$); a first timer for measuring an elapsed time from a time at which the deviation ($\Delta L$) indicates an approximately zero and a second determinator for determining whether the elapsed time measured by the first timer is equal to or above a first predetermined period of time and wherein the first control gain (fd) and the second control gain (fv) are varied according to the detected value of the inter-vehicle distance ($L_T$) and according to the elapsed time measured by the first timer from the time at which the deviation ($\Delta L$) indicates the approximately zero.

12. A system for an automotive vehicle equipped with the system and defined as a system vehicle as claimed in claim 11, wherein the determinator comprises: a first determinator for determining a deviation ($\Delta L$) between the target value of the inter-vehicle distance ($L_T^*$) and the detected value of the inter-vehicle distance ($L_T$); a first timer for measuring an elapsed time from a time at which the deviation ($\Delta L$) indicates an approximately zero and a second determinator for determining whether the elapsed time measured by the first timer is equal to or above a first predetermined period of time and wherein the first control gain (fd) and the second control gain (fv) are varied according to the detected value of the inter-vehicle distance ($L_T$) and according to the elapsed time measured by the first timer from the time at which the deviation ($\Delta L$) indicates the approximately zero.

13. A system for an automotive vehicle equipped with the system and defined as a system vehicle as claimed in claim 11, wherein $\omega n$ is reduced when the detected value of the inter-vehicle distance is above a predetermined inter-vehicle distance value and as the elapsed time from the time at which the deviation ($\Delta L$) indicates the approximately zero becomes increased to the first predetermined period of time (T1).

14. A system for an automotive vehicle equipped with the system and defined as a system vehicle as claimed in claim 13, wherein the determinator further comprises a second timer for measuring an elapsed time from a time at which the deviation ($\Delta L$) does not indicate the approximately zero after the determinator has determined that the system vehicle is following the preceding vehicle at the target value of the inter-vehicle distance; and a third determinator for determining whether the elapsed time measured by the second timer is below a second predetermined period of time (T2), and wherein the first control gain (fd) and the second control gain (fv) are varied according to the detected value of the inter-vehicle distance ($L_T$) and according to the elapsed time measured by the second timer, which is below the second predetermined period of time (T2).

15. A system for an automotive vehicle equipped with the system and defined as a system vehicle as claimed in claim 14, wherein the inter-vehicle distance controller further comprises a fourth determinator for determining whether another vehicle is interrupting between the preceding vehicle and the system vehicle according to a variation in the detected value of the inter-vehicle distance and wherein con is increased in accordance with a normal gain scheduling so that the control gain is set so as to quicken the responsive characteristic of the feedback control system when the detected value of the inter-vehicle distance is equal to or below a predetermined inter-vehicle distance and so as to slow the responsive characteristic of the feedback control system when the detected value of the inter-vehicle distance is above the predetermined inter-vehicle distance, when the fourth determinator determines that the other vehicle is interrupting between the preceding vehicle and the system vehicle.

16. A system for an automotive vehicle equipped with the system and defined as a system vehicle as claimed in claim 15, wherein $\omega n$ is reduced from approximately 0.4 [rad/sec.] to a lowest value of approximately 0.2 [rad/sec.] as the elapsed time from the time at which the deviation ($\Delta L$) indicates the approximately zero becomes increased to the first predetermined period of time.

17. A system for an automotive vehicle equipped with the system and defined as a system vehicle as claimed in claim 16, wherein the detected value of the velocity of the system vehicle is expressed as $V = 1/(1+\tau v s) V^*$ and wherein when $\tau v$ is 0.5 seconds and $\omega n$ is 0.4 [rad/sec.], the first control gain (fd) is 0.08 and the second control gain (fv) is 0.6 and when $\tau v$ is 0.5 seconds and $\omega n$ is 0.2 [rad/sec.], the first control gain (fd) is 0.02 and the second control gain (fv) is 0.8.

18. A system for an automotive vehicle equipped with the system and defined as a system vehicle as claimed in claim 17, wherein the first predetermined period of time is approximately 9 seconds and wherein $\omega n$ is reduced to approximately 0.2 [rad/sec.] when the elapsed time from the time at which the deviation $\Delta L$ indicates approximately zero and measured by the first timer is approximately 9 seconds.

19. A system for an automotive vehicle equipped with the system and defined as a system vehicle, comprising:

a first detector for detecting an inter-vehicle distance from the system vehicle to a preceding vehicle traveling ahead of the system vehicle;

a second detector for detecting a velocity of the system vehicle;

a determinator for determining whether the system vehicle is running behind the preceding vehicle at a target value of the inter-vehicle distance;

an inter-vehicle distance controller having a control system for performing a feedback control of the detected value of the inter-vehicle distance to the target value thereof and for outputting a target value of the velocity of the system vehicle, a control gain of the feedback control system being modified according to the detected value of the inter-vehicle distance and a result of a determination by the determinator; and a vehicle velocity controller for controlling a braking force and a driving force of the system vehicle so as to make a detected value of the system vehicle velocity coincident with the target value of the velocity of the system vehicle wherein the inter-vehicle distance controller sets the control gain such as to quicken a responsive characteristic of the feedback control system when the detected value of the inter-vehicle distance is equal to or below a predetermined inter-vehicle distance value and modifies the set control gain to a new control gain such as to slow the responsive characteristic of the feedback control system when the determinator determines that the system vehicle is running behind the preceding vehicle at the target value of the inter-vehicle distance.

* * * * *